United States Patent
Mikan et al.

(10) Patent No.: US 7,346,360 B1
(45) Date of Patent: *Mar. 18, 2008

(54) LOCATION CACHING WITH EXPIRATION BASED ON LOCATION

(75) Inventors: Jeffrey Clinton Mikan, Cumming, GA (US); Justin McNamara, Atlanta, GA (US); Fulvio Cenciarelli, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 103 days.

This patent is subject to a terminal disclaimer.

(21) Appl. No.: 11/196,015

(22) Filed: Aug. 3, 2005

(51) Int. Cl.
*H04Q 7/20* (2006.01)
(52) U.S. Cl. ............................... 455/456.1; 455/456.2; 455/404.2
(58) Field of Classification Search ............. 455/404.1, 455/456.1–457, 404.2
See application file for complete search history.

(56) References Cited

U.S. PATENT DOCUMENTS

| 2003/0101225 A1* | 5/2003 | Han et al. ............... 709/206 |
| 2005/0043037 A1* | 2/2005 | Ioppe et al. ............ 455/456.1 |
| 2005/0130680 A1* | 6/2005 | Northcutt ............... 455/457 |

* cited by examiner

*Primary Examiner*—Duc M. Nguyen
*Assistant Examiner*—Anthony S. Addy
(74) *Attorney, Agent, or Firm*—Powell Goldstein LLP

(57) ABSTRACT

A system for locating a device in a wireless network that caches a known location and sets an expiration time based on the location. The system correlates the location with known places, such as movie theaters, restaurants, etc. to set the expiration time. For example, if a device was known to be at a movie theater, the expiration time would be set to a longer period of time. However, if the device was determined to be in a moving location, the expiration time would be set to a shorter period of time. The system also includes a mechanism to query the cached location based on a current time of the query and a granularity variable the accounts for a geographic area in which the device is located. The system also accounts for special locations where the mobile device will likely not be moving for long periods of time, or locations where the mobile device may move great distances between determinations of actual location.

20 Claims, 3 Drawing Sheets

LOCATION CACHING WITH EXPIRATION BASED ON LOCATION

FIELD OF THE INVENTION

The present invention is directed to determining location of a mobile device. In particular, the present invention is directed to a system for caching a location of the mobile device.

BACKGROUND OF THE INVENTION

Global system for mobile communication (GSM) is one of the most widely used wireless access systems in today's fast growing communication systems. GSM provides circuit-switched data services to subscribers, such as mobile telephone or computer users. General Packet Radio Service (GPRS), which is an extension to GSM technology, introduces packet switching to GSM networks. GPRS uses a packet-based wireless communication technology to transfer high and lower speed data and signaling in an efficient manner. GPRS optimizes the use of network and radio resources, thus enabling the cost effective and efficient use of GSM network resources for packet mode applications.

Determining a location of a subscriber's mobile station/handset is often desirable. However, this determination increases radio traffic to the mobile station. Also, many operators of public mobile land networks (PLMN) incur an per/transaction fee for queries to location services. Given the anticipated number of location-based services, these fees may become quite substantial.

SUMMARY OF THE INVENTION

A system for locating a device in a wireless network that caches a known location and sets an expiration time based on the location. The system correlates the location with known places, such as movie theaters, restaurants, etc. to set the expiration time. For example, if a device was known to be at a movie theater, the expiration time would be set to a longer period of time. However, if the device was determined to be in a moving location, the expiration time would be set to a shorter period of time. The system also includes a mechanism to query the cached location based on a current time of the query and a granularity variable the accounts for a geographic area in which the device is located. The system also accounts for special locations where the mobile device will likely not be moving for long periods of time, or locations where the mobile device may move great distances between determinations of actual location.

DETAILED DESCRIPTION OF ILLUSTRATIVE EMBODIMENTS

Figure 1:
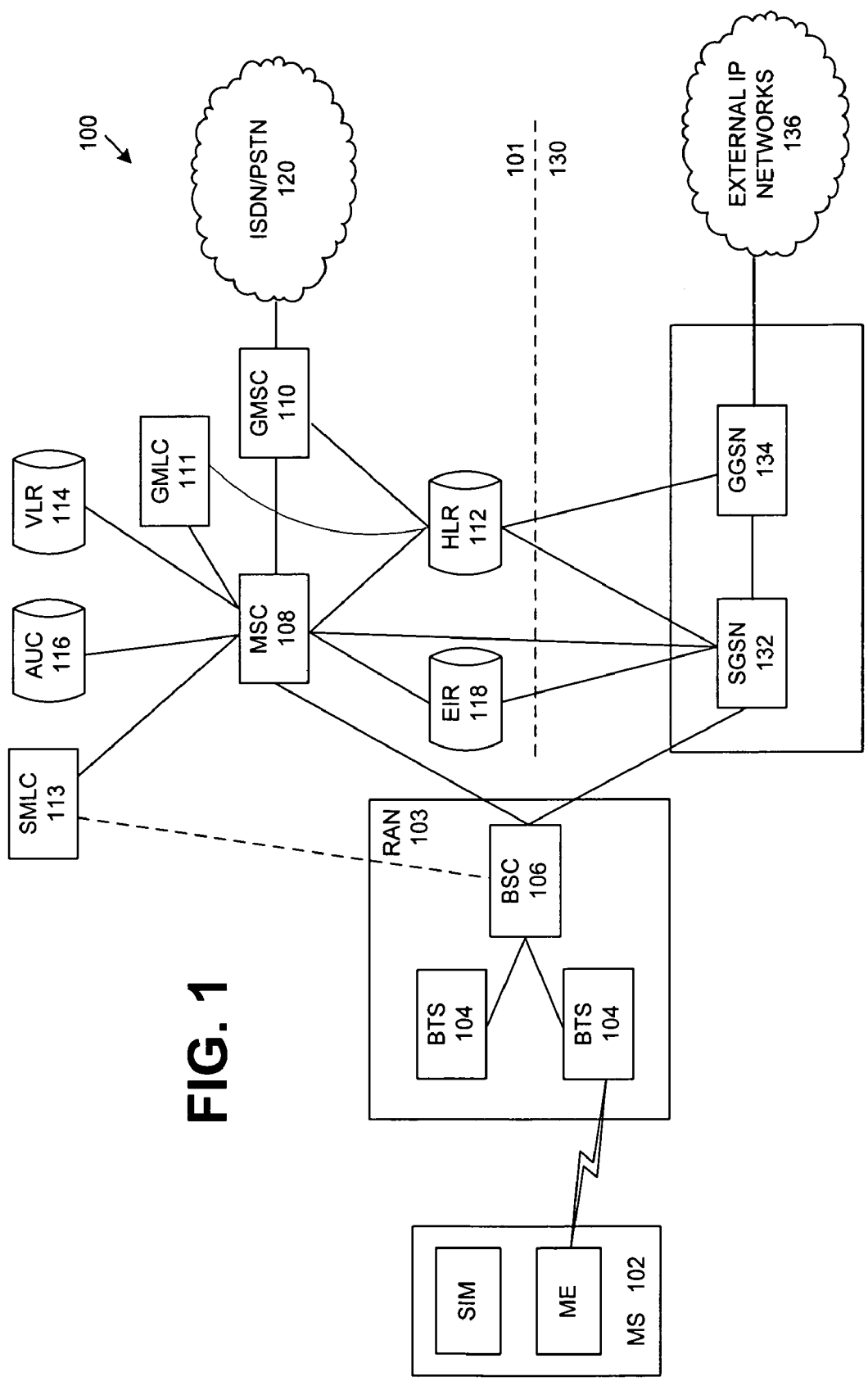
FIG. 1 is an overview of an exemplary wireless communication environment.

FIG. 1 shows a GSM/GPRS network architecture 100 the includes a GSM core network 101 and a GPRS network 130. The GSM core network 101 includes a Mobile Station (MS) 102, at least one Base Transceiver Station (BTS) 104 and a Base Station Controller (BSC) 106. The MS 102 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 104 is physical equipment, such as a radio tower, that enables a radio interface to communicate with the MS. Each BTS may serve more than one MS. The BSC 106 manages radio resources, including the BTS. The BSC may be connected to several BTSs. The BSC and BTS components, in combination, are generally referred to as a base station (BSS) or radio access network (RAN) 103.

The GSM core network 101 also includes a Mobile Switching Center (MSC) 108, a Gateway Mobile Switching Center (GMSC) 110, a Home Location Register (HLR) 112, Visitor Location Register (VLR) 114, an Authentication Center (AuC) 118, and an Equipment Identity Register (EIR) 116. The MSC 108 performs a switching function for the network. The MSC also performs other functions, such as registration, authentication, location updating, handovers, and call routing. The GMSC 110 provides a gateway between the GSM network and other networks, such as an Integrated Services Digital Network (ISDN) or Public Switched Telephone Networks (PSTNs) 120. In other words, the GMSC 110 provides interworking functionality with external networks.

The HLR 112 is a database that contains administrative information regarding each subscriber registered in a corresponding GSM network. The HLR 112 also contains the current location of each MS. The VLR 114 is a database that contains selected administrative information from the HLR 112. The VLR contains information necessary for call control and provision of subscribed services for each MS currently located in a geographical area controlled by the VLR. The HLR 112 and the VLR 114, together with the MSC 108, provide the call routing and roaming capabilities of GSM. The AuC 116 provides the parameters needed for authentication and encryption functions. Such parameters allow verifications of a subscriber's identity. The EIR 118 stores security-sensitive information about the mobile equipment.

Location services (LCS) are provided by a Gateway Mobile Location Center (GMLC) 111 and/or a Serving Mobile Location Center (SMLC) 113. The GMLC 111 may request routing information from the HLC 112 and send positioning requests to either the Visited Mobile Switching Centre (VMSC, not shown), a Serving GPRS Support Node (SGSN 132) or MSC 108, and receives final location estimates from the corresponding entity.

The SMLC 113 is either a separate network element or an integrated functionality in the BSC 106. The SMLC manages the overall coordination and scheduling of resources required for the location of a MS 102. The SMLC 1113 also calculates the final location estimate and estimates the achieved accuracy. The SMLC 113 may control a number of Location Measurement Unit (LMU) for the purpose of obtaining radio interface measurements to locate or help locate MS subscribers in the area that it serves.

To gain access to GSM services, such as speech, data, and short message service (SMS), the MS first registers with the network to indicate its current location by performing a location update and IMSI attach procedure. The MS 102 sends a location update including its current location information to the MSC/VLR, via the BTS 104 and the BSC 106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 130 is logically implemented on the GSM core network architecture by introducing two packet-switching network nodes, the serving GPRS support node (SGSN) 132 and a Gateway GPRS support node (GGSN) 134. The SGSN 132 is at the same hierarchical level as the MSC 108 in the GSM network. The SGSN controls the connection between the GPRS network and the MS 102. The SGSN also keeps track of individual MS's locations and security functions and access controls. The GGSN 134 provides a gateway between the GPRS network and a public packet network (PDN) or other IP networks 136. That is, the GGSN provides interworking functionality with external networks, and sets up a logical link to the MS through the SGSN. When packet-switched data leaves the GPRS network, it is transferred to an external TCP-IP network 136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, are the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls as the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 130 can be designed to operate in three network operation modes (NOM1, NOM2 and NOM3). A network operation modes of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS, In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

Figure 2:
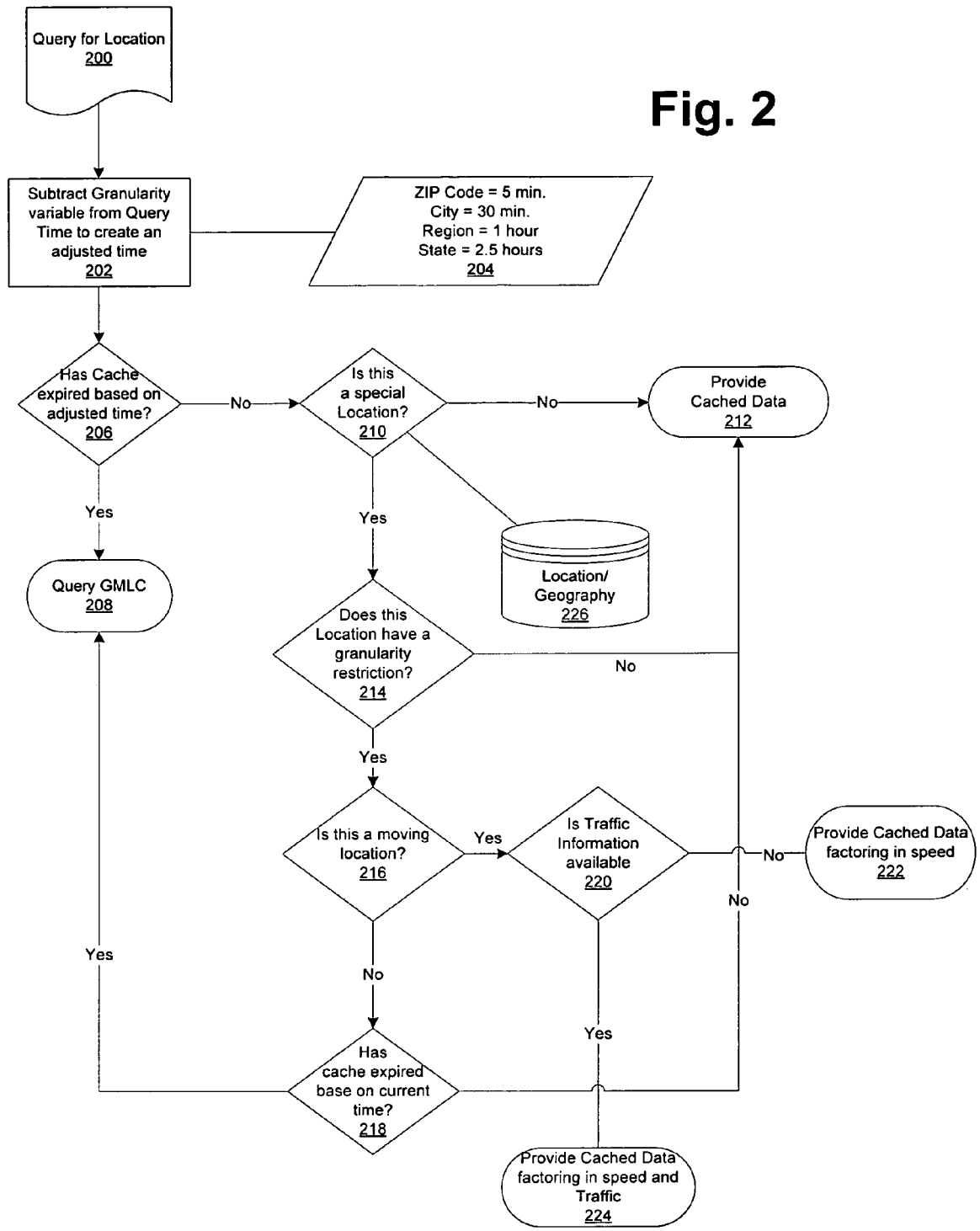
FIG. 2 is an exemplary process performed to query a location of a mobile station.

Referring now to FIG. 2, there is illustrated an exemplary process performed in a position engine to query for a location of, e.g., an MS using a cached location database. The position engine may be communicatively connected to the network 100 or within one of the elements therein discussed with reference to FIG. 1. A cached location database 226 enables the operator of the PLMN under certain circumstances to determine an estimated location of the MS, without the need to query the GMLC 111. This advantageously reduces RF traffic and costs.

The process beings at step 200, the query for location is made. At step 202, a granularity window variable is substrated from a time that the query is made to create an adjusted time. The granularity variable is a time value that allows for proper caching based on the query request and is used to account for how long it would take for the average user to leave a geographic area. Exemplary granularities are shown in step 204. For example, a granularity variable for a ZIP code may be 5 minutes, where as granularity variable for a city may be 30 minutes. Larger areas, such as North Atlanta, may have a granularity variable of one hour and a state may have one of 2.5 hours. Additional (or fewer) granularity variable times maybe defined for different geographic areas.

If a service is requesting a geographic areas of the size of a city, then 30 minutes would be substract from the current time (e.g., 12:00) to create an 11:30 adjusted time. If a cache value time was 11:40, the resulting adjusted time would be less than the cache value time (i.e., 11:30<11:40).

At step 206, it is determined if the cache has expired based on the adjusted time determined at step 202. If the cache has expired, then the GMLC (or other location service) is queried at step 208 for the actual location of the MS. If the cache has not expired, then it is determined at step 210 if the location of the MS is special. The location/geography database 226 contains a listing of special locations, which may include movie theaters, restaurants, etc. where it is likely that a subscriber will not be moving for long periods of time. Alternatively, the special locations may include airports where it is likely that the subscriber may be moving a great distance between actual queries of the MS. The location/geography database 226 also includes the cached location values, as noted above.

If the location is not special, the cached location is provided at step 212 in response to the query. If the location is special, then it is determined at step 214 is there is a granularity restriction for that location. Steps 202 and 206 check to see if granularity of values allows the cached value to be used. If the cached value cannot be used, there is no reason to access the location cache database. However, if the cache can be used based on the granularity, then it is determined if it the location restricts the use of the granularity window. An example of places that would have granularity restrictions are airports, high speed trains, etc.

If there is not a restriction, the cached location data is provided at step 212. If there is a granularity restriction, then it is determined at step 216 if the MS is in a moving location, such as a roadway, railroad, etc. If it is in a moving location, then at step 220, it is determined if traffic and/or transit information is available about the location. If there is information available, the cached location data is provided factoring in the speed of the MS, as well as the traffic and/or transit information. For example, it may be determined that the MS is traveling at 65 MPH along a freeway, but there is road construction ahead of the cached location of the MS causing the average speed to drop to 20 MPH. With this information, the cached location data can be adjusted to reflect the change in speed in the construction zone.

If the MS is in a moving location, but there is not traffic information available, then the cached location data is provided at step 222, factoring in the speed of the MS.

Figure 3:
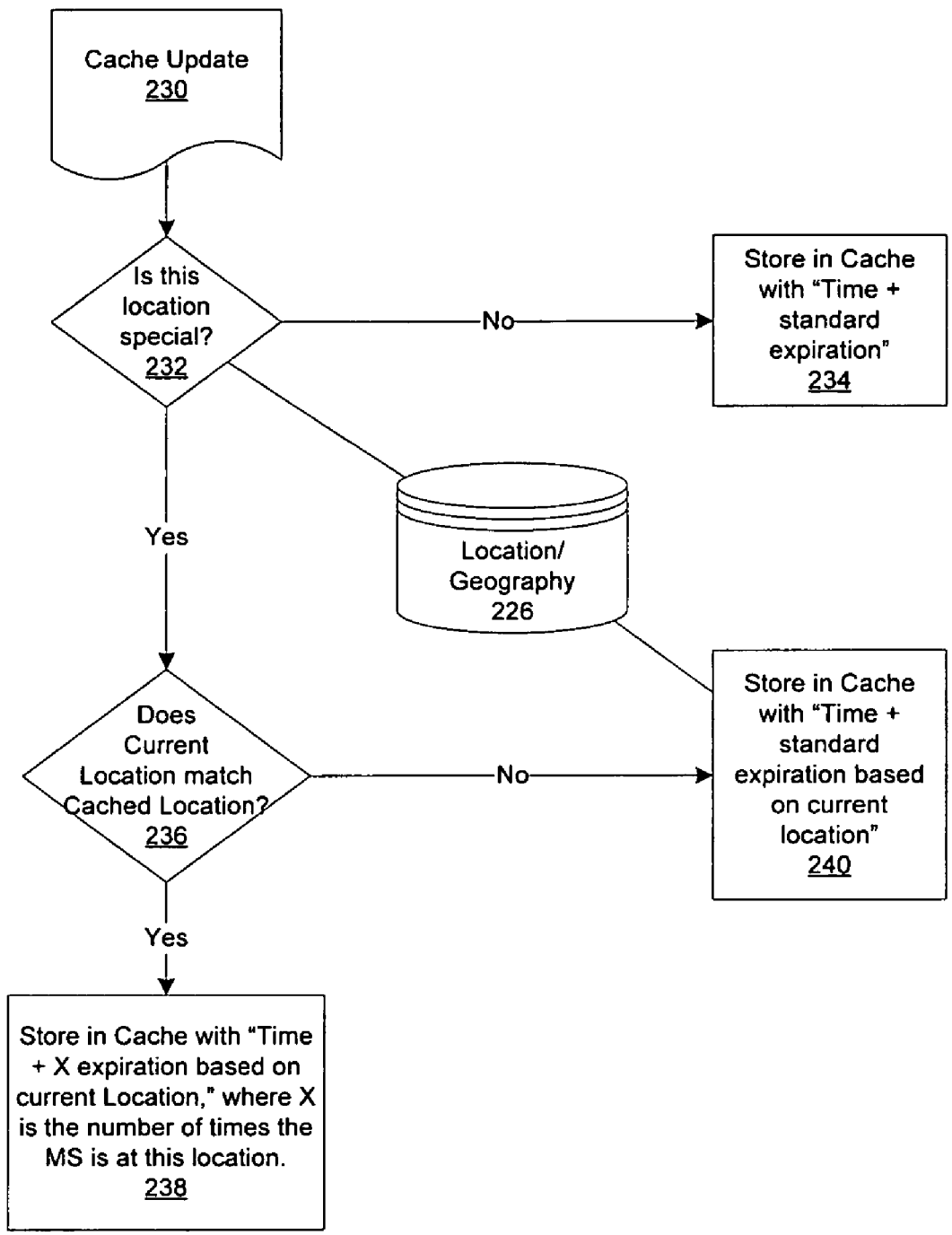
FIG. 3 is an exemplary process performed to update a location cache.

Referring now to FIG. 3, there is illustrated the exemplary process performed to update the information contained in the location cache. The process begins a step 230 where it is determined that a cache update is to be performed. Next, at step 232, it is determined if the location to be updated is special, as described above. If the location is not special, then at step 234 the location information is stored in the cache with a current time plus standard expiration increment. The standard expiration may be a value between 1 minute and 5 minute based on the location and is used to determined for how long the value stored in the cache should be considered a good value. If the location is special (as stored in the location/geography database 226), then at step 236, it is determined if the current location of the MS matches the cached location in the database 226. If there is not a match at step 236, then the location information is stored in the cache with a time plus standard expiration based on the current/special location (step 240). If there is a match at step 236, then a step 238 the location information is stored in the cache with a time plus an "X expiration value" based on the current/special location, where X is the number of times the MS was determined to be a the special location.

The "X expiration value" may be determined as follows. The X expiration time preferably varies per iteration when it is determined that the MS is at a special place. For example, the first time the MS location is queried and it is determined that the MS is at, e.g., a movie theater, the location cache is expired in 5 minutes (assuming that tickets are being purchased). Upon a second query after expiration of the 5 minutes, if the MS is still at the movie theater, a new expiration may be set at 2 hours (assuming that a movie is being viewed). Following the 2 hour expiration, each subsequent expiration may be 10 minutes (i.e., assuming that the movie is still being viewed, but likely ending soon). Thus, in the database 226, the following may be stored.

| Location Type | Iteration | Time (minutes) |
|---|---|---|
| Theater | 1 | 5 |
| Theater | 2 | 120 |
| Theater | 3 | 10 |

It is noted that the X expiration value maybe determined to be different times in accordance with different locations.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any environment, whether wired or wireless, and may be applied to any number of such devices connected via a communications network and interacting across the network. Therefore, the present invention should not be limited to any single embodiment, but rather should be construed in breadth and scope in accordance with the appended claims.

What is claimed:

1. A method of providing information in response to a query of a database containing cached data regarding a location of a mobile device, comprising:
   receiving a query of a database containing cached data regarding a location of a mobile device, said cached data including a time at which said location data was cached and said query having a desired granularity, said granularity representing a size of a geographic area to be returned by said query;
   determining a granularity variable, said granularity variable representing a time value based on the size of the geographic area associated with said desired granularity;
   determining a time of said query;
   determining an adjusted time of said query, said adjusted time being based on the time of said query and said granularity variable;
   comparing said adjusted time to said cached data time;
   determining characteristics of said location; and
   providing said cached data in response to said query in accordance with said desired granularity, said adjusted time of said query and said characteristics of said location.

2. The method of claim 1, said determining characteristics of said location further comprising determining if said location is special.

3. The method of claim 2, further comprising determining whether said location has a granularity restriction, said granularity restriction preventing an adjustment to said time of said query.

4. The method of claim 3, further comprising:
   determining if the mobile device is at a moving location;
   determining if information regarding one of traffic and transit associated with the moving location is available;
   determining a speed at which the mobile device is moving; and
   adjusting said cached location data based on said speed and one of said traffic and transmit information.

5. The method of claim 1, further comprising:
   determining if said cached data has expired; and
   querying a location service for said location associated with said mobile device if said cached data has expired.

6. The method of claim 1, wherein said mobile device is a wireless handset communicatively connected to a wireless telephony network.

7. The method of claim 1, wherein said granularity variable represents a time required to leave said geographic area represented by said granularity of said requested location data.

8. The method of claim 1, further comprising:
   determining a first granularity variable, said first granularity variable representing a first time value based on a size of a first geographic area associated with said desired granularity;
   determining a second granularity variable, said second granularity variable representing a second time value based on a size of a second geographic area associated with said desired granularity;
   wherein said adjusted time of said query is based on said time of said query and at least one of said first and said second granularity variables.

9. The method of claim 8, wherein said second geographic area is larger than and encompasses said first geographic area.

10. The method of claim 1, wherein said granularity variable represents a maximum time required to leave said geographic area represented by said granularity of said requested location data.

11. The method of claim 1, wherein said granularity variable defines a maximum boundary of a validity of said cached location data to identify said location of said mobile device.

12. The method of claim 1, further comprising:
  determining a plurality of granularity variables, each of said plurality of granularity variables being associated with a size of a geographic area associated with said desired granularity to be returned by said query;
  determining an adjusted time of said query, said adjusted time being determined based on the time of said query and at least one of said plurality of said granularity variables; and
  providing said cached data in response to said query of said database for said location of said mobile device, said desired granularity of said query representing a maximum boundary of the size of a geographic area associated with one of said plurality of granularity variables.

13. A system for determining a present location of a device in response to a query, comprising:
  a radio network capable of communicating with said device;
  a location database configured to cache data regarding a cached location of said device, said cached data including a time at which said cached location data was cached; and
  a position determining engine capable of receiving a query of said location database, said query having a desired granularity, said granularity representing a size of a geographic area to be returned by said query;
  said position determining engine being further capable of determining a granularity variable, said granularity value representing a time value based on the size of the geographic area associated with said desired granularity, determining a time of said query, determining an adjusted time of said query, said adjusted time being based on the time of said query and said granularity variable, comparing said adjusting time to said cached data time, determining characteristics of said location, and providing said cached data in response to said query in accordance with said granularity, said adjusted time of said query, and said characteristics of said location.

14. The system of claim 13, wherein if said characteristics of said location indicate that said location is special, it is determined if said location has a granularity restriction that prevents an adjustment to said time of said query.

15. The system of claim 13, said position determining engine being further capable of determining whether said mobile device is moving.

16. The system of claim 13, wherein if a cached location in said location database has expired based on said time, said system determines an actual position of said mobile device via said radio network.

17. A method of caching data to be used to respond to a query for a location of a mobile device, comprising:
  receiving information regarding a location of a mobile device, said information having a granularity associated with a size of a geographic area of said present invention;
  determining a granularity variable associated with said granularity, said granularity variable representing a time value based on the size of the geographic area associated with said granularity;
  determining characteristics about said location, said characteristics including information regarding whether said location is a special location;
  determining whether said location of said mobile device matches a cached location; and
  storing said location in a cache database together with a current time and an expiration time value associated with said location, said expiration time value being based on said granularity of said location, said granularity variable, and an adjusted time of a query for said location, said adjusted time being based on a time of said query and said granularity variable, said characteristics of said location, said characteristics including whether said location is a special location.

18. The method of claim 17, further comprising storing said location in said location database in accordance with a number of times said mobile device is determined to be at said location.

19. The method of claim 17, further comprising:
  setting said expiration time to a first expiration time based on a first determination that said mobile device is at said location; and
  setting said expiration time to a second expiration time based on a second determination that said mobile device is at said location.

20. The method of claim 19, further comprising setting said expiration to a subsequent expiration time based on a subsequent determination that said mobile device is at said location.

* * * * *